US008824319B2

(12) United States Patent  
Sawazaki et al.

(10) Patent No.: US 8,824,319 B2  
(45) Date of Patent: Sep. 2, 2014

(54) TRANSMITTING APPARATUS, TRANSMITTING AND RECEIVING APPARATUS, COMMUNICATION SYSTEM, AND COMMUNICATION METHOD

(75) Inventors: Hideo Sawazaki, Hyogo (JP); Masao Oki, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 171 days.

(21) Appl. No.: 13/141,219

(22) PCT Filed: Jan. 22, 2010

(86) PCT No.: PCT/JP2010/050828
§ 371 (c)(1),
(2), (4) Date: Jun. 21, 2011

(87) PCT Pub. No.: WO2010/087292
PCT Pub. Date: Aug. 5, 2010

(65) Prior Publication Data  
US 2011/0255415 A1    Oct. 20, 2011

(30) Foreign Application Priority Data

Jan. 27, 2009    (JP) ................................. 2009-015294

(51) Int. Cl.  
*H04L 12/26* (2006.01)  
*H04L 1/18* (2006.01)

(52) U.S. Cl.  
CPC .......... *H04L 43/0894* (2013.01); *H04L 1/1816* (2013.01)  
USPC ........................................................ 370/252

(58) Field of Classification Search  
CPC .......................... H04L 1/1816; H04L 43/0894  
See application file for complete search history.

(56) References Cited

U.S. PATENT DOCUMENTS 5,317,563 A * 5/1994 Oouchi et al. ................. 370/232  
5,901,205 A * 5/1999 Smith et al. ................ 379/93.01  
(Continued)

FOREIGN PATENT DOCUMENTS

CN    101141226 A    3/2008  
EP    1 389 848 A1    2/2004  
(Continued)

OTHER PUBLICATIONS

International Search Report (PCT/ISA/210) issued on Feb. 16, 2010, by Japanese Patent Office as the International Searching Authority for International Application No. PCT/JP2010/050828.

(Continued)

Primary Examiner — Gregory Sefcheck  
(74) Attorney, Agent, or Firm — Buchanan Ingersoll & Rooney PC

(57) ABSTRACT

In a vehicle-side transmitting apparatus that applies a multi-link system employing a logical plurality of communication lines and includes a transmitting unit that transmits transmission data that should be transmitted to a receiving apparatus of a communication partner, the transmitting unit monitors changes in transmission rates of communication lines A to C, calculates, based on rated transmission rates, information concerning changes in the communication lines A to C, and a transmission time until data that should be transmitted to a ground-side receiving apparatus is completed to be transmitted to the ground-side receiving apparatus, fluctuating transmission rates of the communication lines A to C, and determines, based on the calculated transmission rates, allocation amounts to the communication lines of data that should be transmitted this time.

16 Claims, 6 Drawing Sheets

(56) References Cited

U.S. PATENT DOCUMENTS

| | | | |
|---|---|---|---|
| 5,912,895 A * | 6/1999 | Terry et al. | 370/445 |
| 6,076,181 A * | 6/2000 | Cheng | 714/748 |
| 6,101,168 A * | 8/2000 | Chen et al. | 370/228 |
| 6,341,145 B1 | 1/2002 | Hioe et al. | |
| 6,469,993 B1 * | 10/2002 | Seo et al. | 370/329 |
| 7,002,923 B2 * | 2/2006 | Golitschek et al. | 370/253 |
| 7,072,307 B2 * | 7/2006 | Tong et al. | 370/253 |
| 7,113,521 B2 * | 9/2006 | Miller et al. | 370/474 |
| 7,193,966 B2 * | 3/2007 | Gupta et al. | 370/231 |
| 7,483,389 B2 * | 1/2009 | Tong et al. | 370/253 |
| 7,570,621 B2 * | 8/2009 | Garg | 370/335 |
| 7,583,614 B2 * | 9/2009 | Golitschek et al. | 370/253 |
| 7,675,941 B2 * | 3/2010 | Kim et al. | 370/473 |
| 7,751,372 B2 * | 7/2010 | Monsen | 370/335 |
| 7,929,925 B2 * | 4/2011 | Luo et al. | 455/101 |
| 8,009,696 B2 * | 8/2011 | Williams et al. | 370/473 |
| 8,068,435 B2 * | 11/2011 | Agarwal et al. | 370/249 |
| 8,184,551 B2 * | 5/2012 | Hu et al. | 370/252 |
| 8,516,325 B2 * | 8/2013 | Wan et al. | 714/748 |
| 2004/0146027 A1 * | 7/2004 | Shinozaki et al. | 370/335 |
| 2008/0016217 A1 * | 1/2008 | Astley et al. | 709/226 |
| 2011/0255415 A1 * | 10/2011 | Sawazaki et al. | 370/241 |

FOREIGN PATENT DOCUMENTS

| | | |
|---|---|---|
| EP | 1 936 852 A1 | 6/2008 |
| JP | 6-318902 A | 11/1994 |
| JP | 2000-216815 A | 8/2000 |
| JP | 3540183 B2 | 7/2004 |
| JP | 2008-205765 A | 9/2008 |

OTHER PUBLICATIONS

Written Opinion (PCT/ISA/237) issued on Feb. 16, 2010, by Japanese Patent Office as the International Searching Authority for International Application No. PCT/JP2010/050828.

Jun. 21, 2013 Chinese First Office Action issued in Chinese Patent Application No. 201080005069.3.

Extended European Search Report dated Dec. 13, 2013, issued by the European Patent Office in corresponding European Patent Application No. 10735761.8-1851/2384073. (8 pages).

* cited by examiner

FIG.2
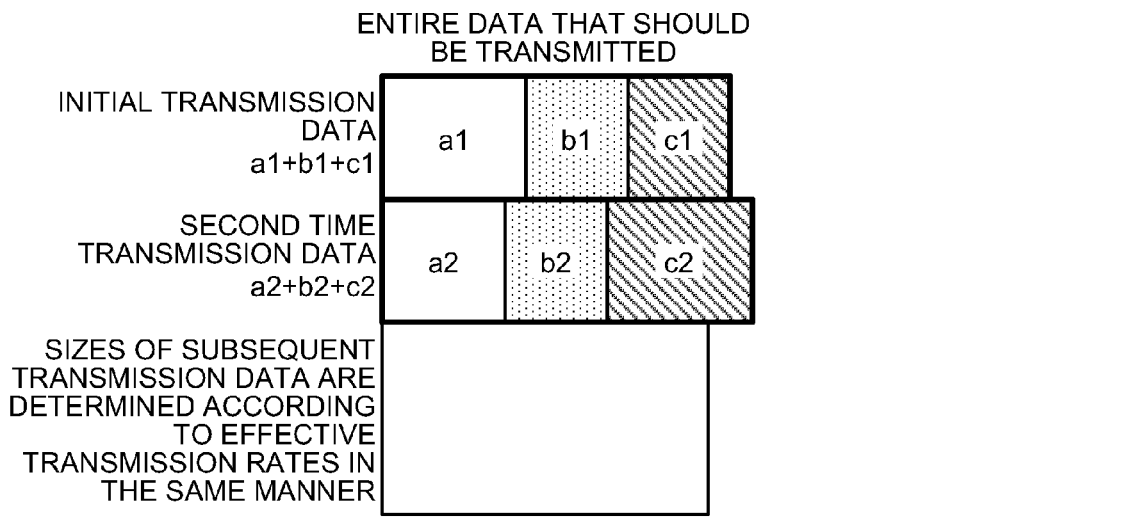
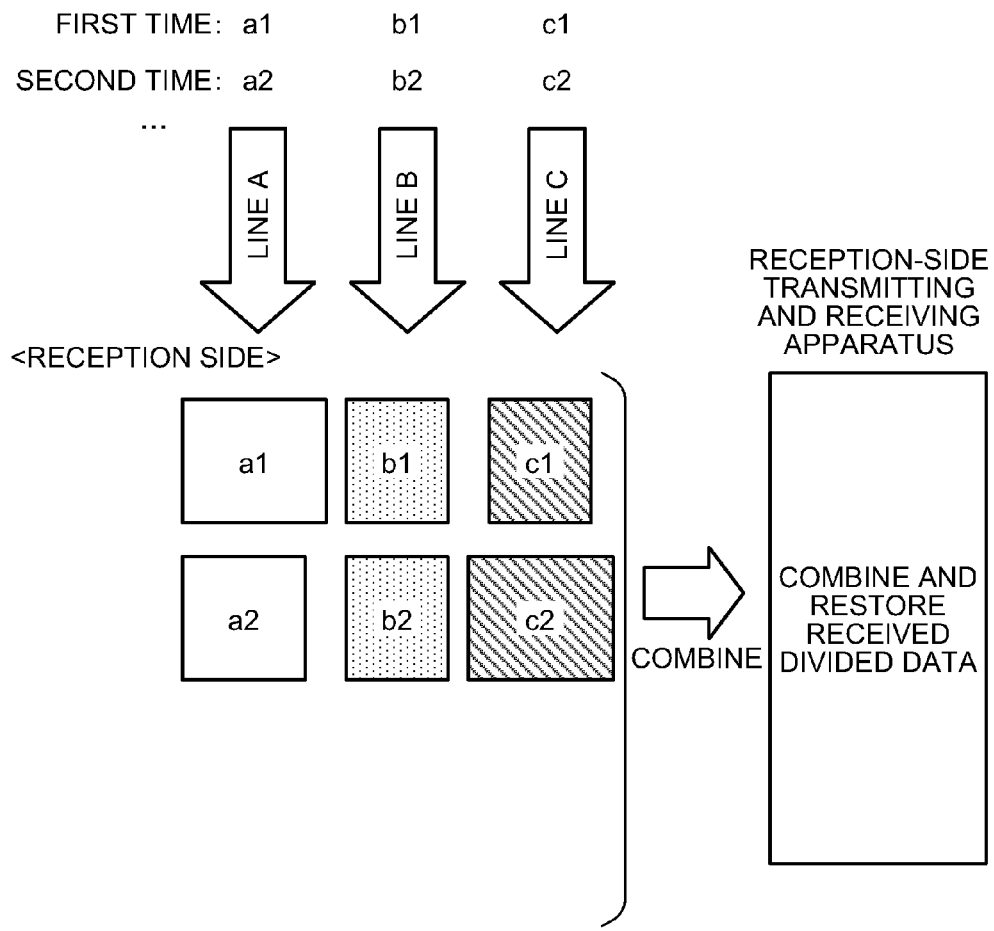

TRANSMITTING APPARATUS, TRANSMITTING AND RECEIVING APPARATUS, COMMUNICATION SYSTEM, AND COMMUNICATION METHOD

FIELD

The present invention relates to a transmitting apparatus, a transmitting and receiving apparatus, a communication system, and a communication method, and, more particularly to a transmitting apparatus, a transmitting and receiving apparatus, a communication system, and a communication method that can increase communication speed by using a plurality of communication lines.

BACKGROUND ART

In recent years, information provided to passengers and crew members who use mobile bodies such as trains tends to increase. It is desirable to apply a high-speed line suitable for a data capacity to a line for communicating this information data (hereinafter simply referred to as "line"). However, the increase in speed of the line often involves enormous investments of expenses, time, and the like for establishment of a communication system. Therefore, as means for solving the problem, a method such as multi-link for using a plurality of existing lines to expand a communication capacity as a whole is known. When lines of a wireless system are applied to a communication system, transmission rates of the lines dynamically change according to, for example, fluctuation in a peripheral environment of a mobile body. Therefore, the multi-link by the wireless system has a problem in that, in some case, actual transmission rates of the lines do not coincide with one another and band use efficiency of the entire lines falls.

In the past, a multi-link communication apparatus (hereinafter simply referred to as "communication apparatus") described in Patent Literature 1 includes a monitoring unit that monitors effective transmission rates of wireless communication lines and a dividing unit that allocates, based on a monitoring result, data amounts corresponding to the effective transfer speeds of the lines to the lines. Data generated first in a communication apparatus on a transmission side is divided into data of fixed sizes corresponding to transmission rates of initial setting (referred to as "rated transmission rates") in the lines by the dividing unit of the transmission side communication apparatus. The divided data (hereinafter referred to as "short data") is transmitted to the lines by a transmitting and receiving unit. On the other hand, the actual transmission rates of the lines are monitored by the transmitting and receiving unit. The monitoring unit acquires the effective transmission rates of the lines from the transmitting and receiving unit every time the short data is transmitted to the lines. When transmission data is generated for the second or more time, the dividing unit divides this transmission data according to the effective transmission rates obtained by the monitoring unit. The communication apparatus in the past configured in this way realizes multi-link communication for keeping throughput of the entire lines high.

CITATION LIST

Patent Literature

Patent Literature 1: Japanese Patent No. 3540183

DISCLOSURE OF INVENTION

Problem to be Solved by the Invention

However, in the related art described in Patent Literature 1, when communication disconnection or an extreme transmission rate delay due to some problem occurs in a line determined as capable of performing data communication among a plurality of lines, regardless of the fact that a line that completes transmission of the short data related to the transmission data generated for the second or more time is present, the transmission of this short data cannot be completed because of the influence of the line in which the failure occurs. As a result, it is likely that the transmission of the entire lines is stopped or is unusually slow. In other words, in a data communication network in which a peripheral environment of a moving vehicle changes or a data communication network used by a large number of users or the like, in some case, a communication failure for which prediction is difficult occurs. Therefore, only with determination based on a data transmission result of the last time, there is a problem in that it is likely that concurrent use of a plurality of lines causes stagnation of the entire lines to the contrary and throughput falls.

The present invention has been devised in view of the above and it is an object of the present invention to obtain a transmitting apparatus, a transmitting and receiving apparatus, a communication system, and a communication method that can improve throughput even when communication disconnection or an extreme delay in transmission rates occurs in a part of lines.

The present invention has been devised in view of the above and it is an object of the present invention to obtain a transmitting apparatus, a transmitting and receiving apparatus, a communication system, and a communication method that can improve throughput even when communication disconnection or an extreme delay in transmission rates occurs in a part of lines.

Means for Solving Problem

In order to solve the aforementioned problems and attain the aforementioned object, a transmitting apparatus that applies a multi-link system employing a logical plurality of communication lines is constructed in such a manner as to include a transmitting unit that transmits transmission data that should be transmitted to a receiving apparatus of a communication partner, wherein the transmitting unit monitors changes in transmission rates of the communication lines, calculates, based on rated transmission rates of the communication lines, information concerning changes in the rated transmission rates, and a transmission time until the receiving apparatus completes reception of the transmission data, fluctuating new transmission rates of the communication lines, and determines, based on the calculated new transmission rates, allocation amounts to the communication lines of data that should be transmitted this time.

Effect of the Invention

According to the present invention, the transmitting apparatus includes a communication control unit that monitors states of communication lines and calculates, every time the transmission data is transmitted by each of the communication lines to the receiving apparatus, changing transmission rates of the communication lines and a dividing unit that divides the transmission data transmitted to the receiving apparatus into data amounts corresponding to transmission rates from the communication control unit and allocates the data to the communication lines. When transmission of data allocated to a "one line" among the lines is completed and transmission of data allocated to "the other line" is not completed, the communication control unit transmits data already transmitted to "the other line" to the "one line" as well. Therefore, there is an effect that it is possible to improve throughput of the entire lines even when communication disconnection or an extreme delay in transmission rates occurs in the other line.

BRIEF DESCRIPTION OF DRAWINGS

FIG. 2 is a diagram of images of division and combination of data.

EMBODIMENTS FOR CARRYING OUT THE INVENTION

Embodiments of a transmitting apparatus, a transmitting and receiving apparatus, a communication system, and a communication method according to the present invention are explained in detail below with reference to the drawings. The present invention is not limited by the embodiments.

First Embodiment

Configuration of a Communication System

Figure 1:
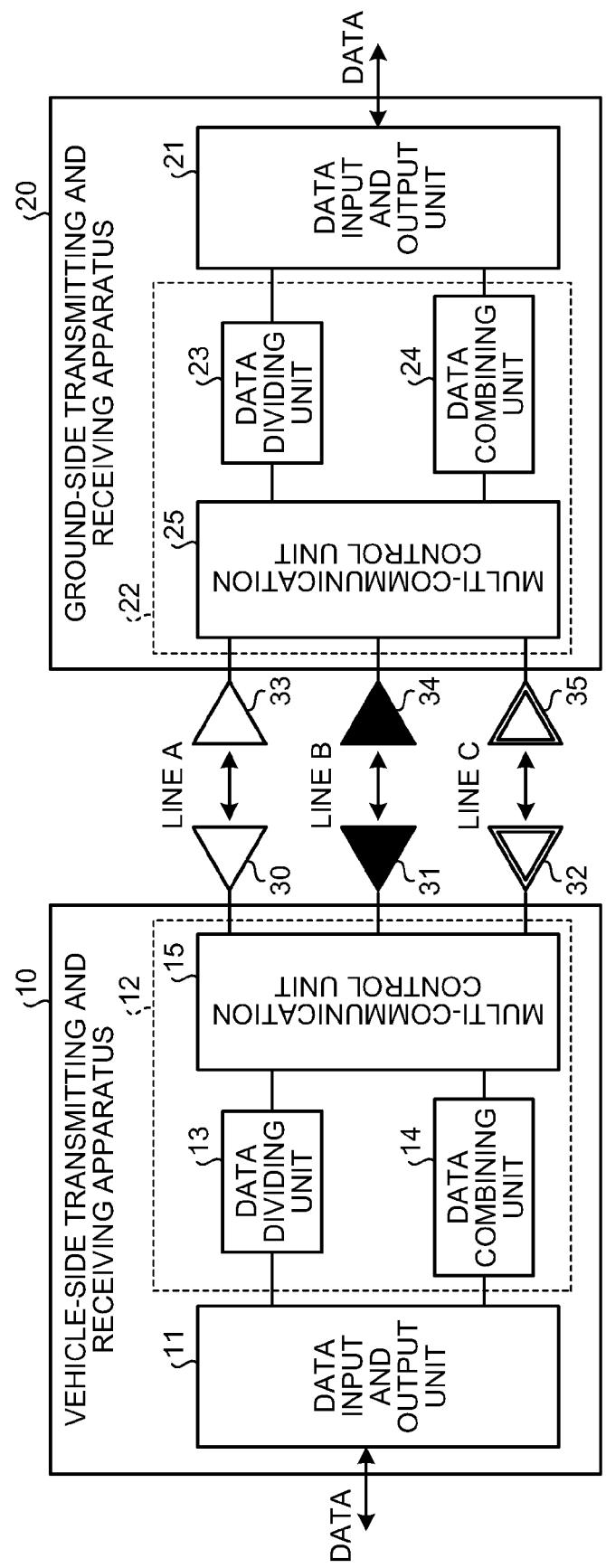
FIG. 1 is a diagram of the configuration of a communication system according to an embodiment.

FIG. 1 is a diagram of the configuration of a communication system according to a first embodiment. FIG. 2 is a diagram of images of division and combination of data. The communication system shown in FIG. 1 includes, as main components, a vehicle-side transmitting and receiving apparatus (hereinafter simply referred to as "transmitting apparatus") 10, a ground-side transmitting and receiving apparatus (hereinafter simply referred to as "receiving apparatus") 20, and communication lines A to C. Information terminal apparatuses (not shown) such as portable terminals and seat-fixed terminals used by passengers and crew members are connected to the transmitting apparatus 10. A server, other networks, and the like (not shown) are connected to the receiving apparatus 20. Further, the transmitting apparatus 10 and the receiving apparatus 20 respectively include antennas 30 to 32 and antennas 33 to 35. The lines A to C are, for example, communication networks through which data can be transmitted and received by radio such as a portable telephone line, a satellite communication line, a millimeter wave communication line, and a wireless LAN. The communication system according to this embodiment regards the communication networks as virtual communication lines, which are regarded as a logical plurality of communication lines, and performs communication in a multi-link system.

(Configuration of a Transmitting and Receiving Apparatus)

The transmitting apparatus 10 includes, as main components, a data input and output unit 11 and a data processing unit 12. The processing unit 12 includes a multi-communication control unit (hereinafter simply referred to as "control unit") 15 functioning as a transmitting unit that is opposed to the communication lines and manages communication control by the multi-link system, a data dividing unit 13, and a data combining unit 14. The input and output unit 11 outputs data from the outside to the processing unit 12 and outputs data from the processing unit 12 to the outside. The input and output unit 11 is an interface for data transmitted and received by the communication system. The input and output unit 11 performs, for example, conversion of a signal format necessary for the transmitting apparatus 10 and the receiving apparatus 20.

Like the transmitting apparatus 10, the receiving apparatus 20 includes an input and output unit 21 and a processing unit 22. The processing unit 22 includes a dividing unit 23, a combining unit 24, and a control unit 25. The functions and the operations of the components of the receiving apparatus 20 are the same as those of the components of the transmitting apparatus 10. Therefore, explanation of the functions and the operations are omitted below.

A figure shown on the upper side of FIG. 2 is an image in which transmission data is divided into three in the dividing unit 13. The lateral direction in the figure represents an overall size of the transmission data. The longitudinal direction of the figure represents a transmission order of the transmission data. For example, data transmitted first is represented as "initial transmission data" and data transmitted next is represented as "second time transmission data". The "initial transmission data" and the "second time transmission data" divided by the dividing unit 13 are respectively shown as short data $a1$ to $c1$ and short data $a2$ to $c2$.

Further, in the lateral direction of the figure, the sizes of the short data $a1$ to $c1$ of the "initial transmission data" divided according to transmission rates of the lines A to C are shown. The short data $a1$ to $c1$ respectively have different sizes because the transmission rates of the lines A to C are different. Similarly, the sizes of the short data $a2$ to $c2$ of the "second time transmission data" are calculated according to effective transmission rates of the lines A to C obtained when the short data $a1$ to $c1$ are transmitted. In this way, in some case, the sizes of the short data $a1$ to $c1$ are respectively different from those of the short data $a2$ to $c2$. The same holds true for transmission data transmitted for a third or more time. Therefore, explanation of the transmission data is omitted below. Details of the effective transmission rates are explained later.

For example, the short data $a1$ and $a2$ are transmitted to the receiving apparatus 20 via the line A, the short data $b1$ and $b2$ are transmitted to the receiving apparatus 20 via the line B, and the short data $c1$ and $c2$ are transmitted to the receiving apparatus 20 via the line C.

A figure on the lower side of FIG. 2 is an image in which short data transmitted via the lines A to C are combined and restored in the combining unit 24 of the receiving apparatus 20. An operation for combining and restoring the short data $a1$ to $c1$ and the short data $a2$ to $c2$ in the combining unit 24 is explained later.

For example, an operation for dividing data that should be transmitted from the transmitting apparatus 10 to the receiving apparatus 20 is explained below. When the dividing unit 13 receives the "initial transmission data" from the input and output unit 11, the dividing unit 13 divides this "initial transmission data" into the short data $a1$ to $c1$ having lengths corresponding to rated transmission rates of the lines A to C. The dividing unit 13 adds serial numbers and flag bits, which will be necessary in combining and restoring the short data a1 to c1 in the combining unit 24, to the short data a1 to c1 and sends the short data a1 to c1 added with the serial numbers and the like to the control unit 15.

The control unit 15 includes three transmitting and receiving units (not shown) corresponding to the lines A to C. The transmitting and receiving units transmit the short data a1 to c1, which are received from the dividing unit 13, to the receiving apparatus 20, which is opposed to the transmitting and receiving units, via the lines A to C. In the receiving apparatus 20, when transmitting and receiving units (not shown) of the control unit 25 receive the short data a1 to c1, the transmitting and receiving units send the short data a1 to c1 to the combining unit 24. The combining unit 24 performs, based on the serial numbers, combination and restoration of the short data a1 to c1. The restored "initial transmission data" is output via the input and output unit 21. Processing during data transmission from the receiving apparatus 20 to the vehicle-side transmitting apparatus 10 is the same as the processing explained above. Therefore, explanation of the processing is omitted.

On the other hand, the control unit 15 always monitors transmission rates of the lines A to C and acquires the effective transmission rates obtained when the short data a1 to c1 are transmitted. The control unit 15 outputs information concerning the acquired effective transmission rates to the dividing unit 13. When the dividing unit 13 receives the "second time transmission data" from the input and output unit 11, the dividing unit 13 divides, based on the effective transmission rates of the lines A to C, the "second transmission data" and adds serial numbers and the like to the divided short data a2 to c2 and sends the short data a2 to c2 to the control unit 15. The control unit 15 sends the short data a2 to c2 to the lines A to C, always monitors the effective transmission rates of the lines A to C, and outputs information concerning the acquired effective transmission rates to the dividing unit 13. When the dividing unit 13 receives transmission data transmitted for the third or more time, the dividing unit 13 repeats processing same as the processing explained above.

A state is assumed in which, in the lines A to C, for example, although transmission of the short data a2 allocated to the line A (hereinafter referred to as "one line") is completed, because communication disconnection, an extreme transmission rate delay, or the like occurs in the line C (hereinafter referred to as "the other line") that can perform communication, transmission of the short data c2 allocated to the other line C is not completed (a state in which a transmission side does not receive ACK from a reception side). In this case, it has been confirmed by verification of the inventor that, in the related art, there are cases in which data transmission of the entire lines A to C is stopped or is made unusually slow.

To solve such a problem, the communication system according to this embodiment has a function of temporarily storing the short data c2 in a buffer section or the like (not shown) of the control unit 15 and, when a failure or the like occurs in "the other line" C, transmitting the short data c2 to the "one line" A as well. In other words, the control unit 15 has a function of transmitting the short data c2, which is being transmitted to the other line C, to the normal "one line" A as well. Therefore, even in a situation in which the transmission of the short data c2 is substantially delayed or difficult, the control unit 15 can read out the short data c2 from the buffer section and automatically transmits the short data c2 to the "one line" A.

The combining unit 24 of the receiving apparatus 20 restores, based on the serial numbers in the short data a2 to c2, the "second time transmission data". The restored "second time transmission data" is transmitted to the outside via the input and output unit 21. As a result, the communication system according to this embodiment can maintain efficiency of use of the entire lines high and realize efficient data communication. The operations of the dividing unit 13 and the combining unit 24 performed when transmission data transmitted for a third or more time is received are the same as the operations explained above. Therefore, explanation of the operations is omitted.

Figure 3:
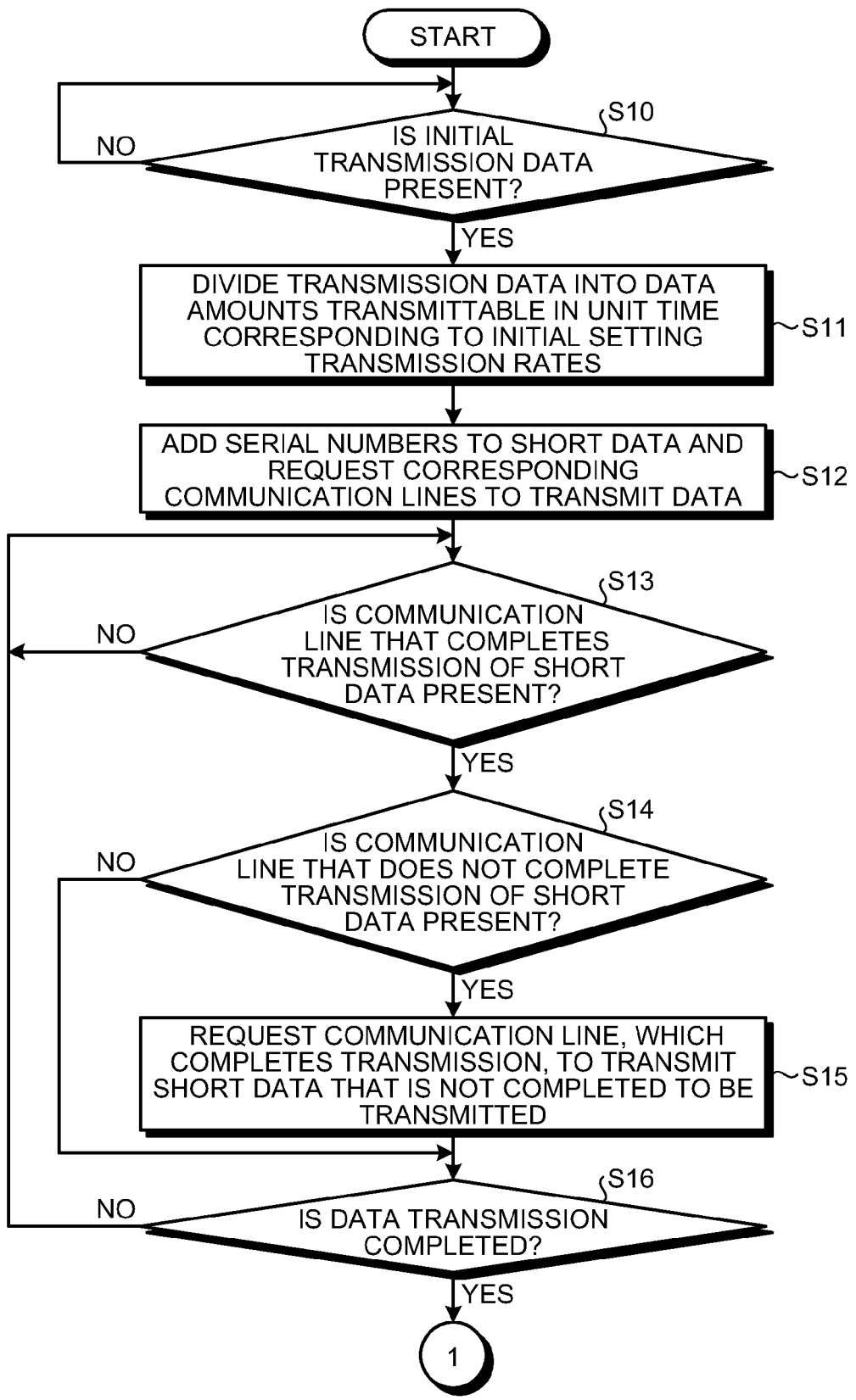
FIG. 3 is a flowchart for explaining a transmission operation for data divided according to initial setting transmission rates.
Figure 4:
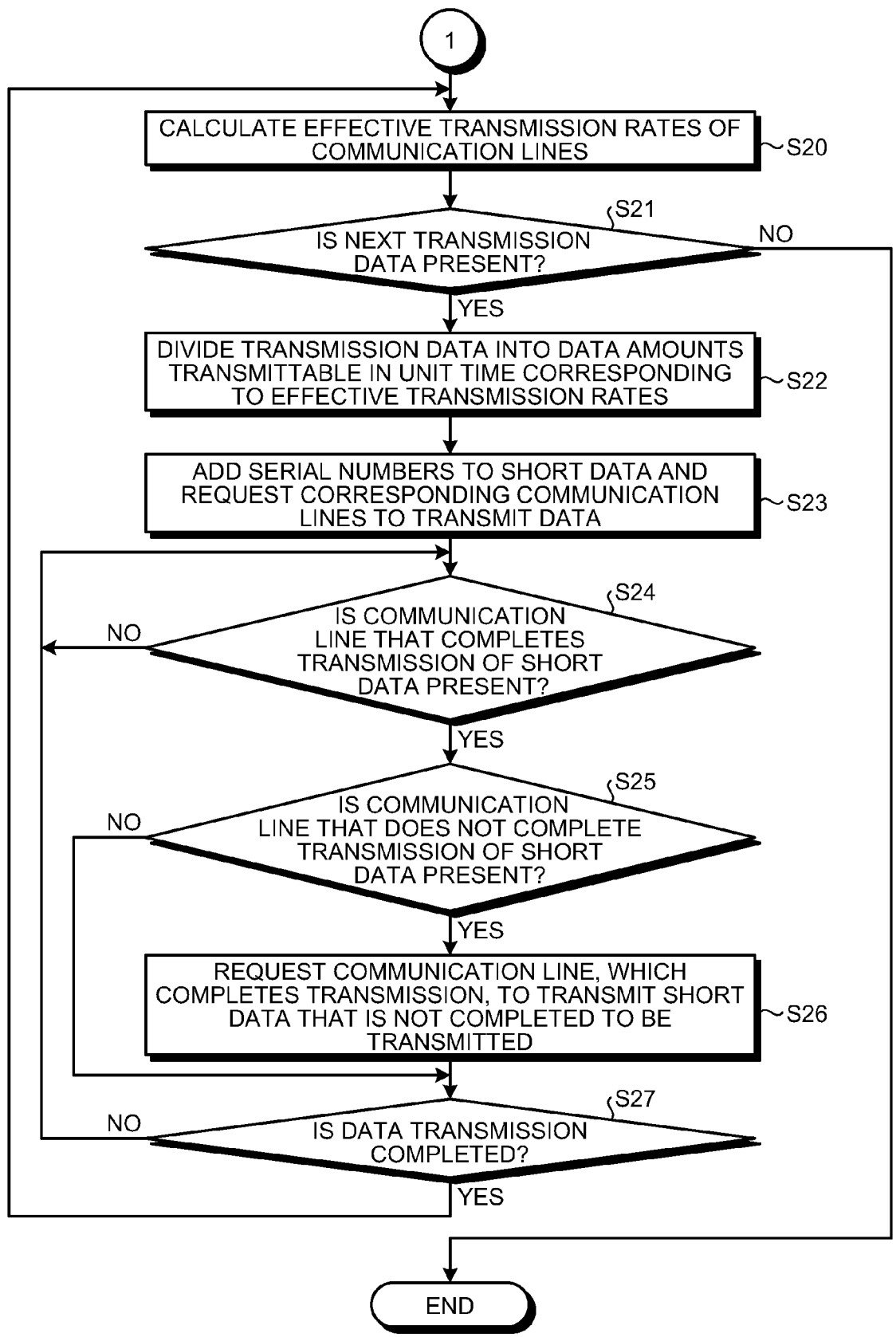
FIG. 4 is a flowchart for explaining a transmission operation for data divided according to effective transmission rates.

The operation of the communication system is explained using flowcharts. FIG. 3 is a flowchart for explaining a transmission operation for data divided according to initial setting transmission rates. FIG. 4 is a flowchart for explaining a transmission operation for data divided according to effective transmission rates. In FIG. 3, when the "initial transmission data" is not present, the same processing is repeatedly executed (No at step S10). When the "initial transmission data" is present (Yes at step S10), the dividing unit 13 divides the "initial transmission data" into data amounts corresponding to initial setting transmission rates of the lines (step S11). The dividing unit 13 adds serial numbers to the divided short data a1 to c1 and sends the short data a1 to c1 to the control unit 15. The control unit 15 requests the lines A to C to transmit the short data a1 to c1 (step S12). When the line A that completes transmission of short data is present (Yes at step S13) and the line C that does not complete transmission of short data is present (Yes at step S14), the control unit 15 requests the line A to transmit the short data c1 (step S15). When the line A completes the transmission of the short data c1 (Yes at step S16), the combining unit 24 of the receiving apparatus 20 restores the "initial transmission data", and processing at the next step is executed.

When there is no line that has completed transmission of the short data a1 to c1 (No at step S13), the control unit 15 repeatedly executes the same processing until a line completes transmission of short data. Further, at step S14, when the transmission of short data is completed by the line C (No at step S14), the control unit 15 executes the processing at step S16.

In FIG. 4, the control unit 15 always monitors transmission rates of the lines A to C. When the short data a1 to c1 are transmitted, the control unit 15 calculates effective transmission rates (step S20) and outputs the effective transmission rates to the dividing unit 13. When transmission data transmitted for the second or more time, which is the next transmission data, is present (Yes at step S21), the dividing unit 13 divides the transmission data into data amounts corresponding to the effective transmission rates (step S22). The dividing unit 13 adds serial numbers to the divided short data a2 to c2 and sends the short data a2 to c2 to the control unit 15. The control unit 15 requests the lines A to C to transmit the short data a2 to c2 (step S23). When the line A that has completed transmission of short data is present (Yes at step S24) and the line C that has not completed transmission of short data is present (Yes at step S25), the control unit 15 requests the line A to transmit the short data c2 (step S26). When the line A has completed the transmission of the short data c2 (Yes at step S27), the combining unit 24 of the receiving apparatus 20 restores transmission data. The dividing unit 13 and the control unit 15 repeat the processing at step S20 and subsequent steps until no transmission data is left. When transmission data transmitted for the second or more time is not present (No at step S21), the dividing unit 13 and the control unit 15 end the processing.

When there is no line that has completed transmission of short data (No at step S24), the control unit 15 repeatedly executes the same processing until a line completes transmission of short data. Further, at step S25, when the transmission of short data is completed by the line C (No at step S25), the control unit 15 executes the processing at step S27.

The effective transmission rates indicate actual transmission rates of transmission performed once or a plurality of times in, among a communication line that has completed transmission of transmission data and a communication line that has completed transmission of transmission data, the communication line that has completed the transmission. As an example in which transmission data is divided using the actual transmission rates, the control unit 15 calculates, based on an average value calculated as an average of the actual transmission rates of transmission performed a plurality of number of times in the line that has completed transmission, fluctuating new transmission rates of the lines. As another example, the control unit 15 calculates, based on actual transmission rates of the last time in the line that has completed transmission, fluctuating new transmission rates of the lines.

The initial transmission data is divided according to the rated transmission rates. However, the initial transmission data can be divided using the actual transmission rates instead of the rated transmission rates. The communication system according to this embodiment is not limited to the three lines A to C and the three short data a to c. The lines A to C of the wireless system are applied to the communication system. However, communication lines of a wired system can also be applied.

In the above explanation, the control unit transmits the data transmitted to the line C to only the line A. However, the present invention is not limited to this. For example, when a "one communication line" that has completed transmission of short data is present and one or a plurality of other communication lines that have not completed transmission of short data are present, the control unit 15 can transmit short data transmitted to a slowest communication line among "the other communication lines" to the "one communication line" as well. When one or a plurality of "one communication lines" that have completed transmission of short data are present and "the other communication line" that has not completed transmission of short data is present, the control unit 15 can transmit short data transmitted to "the other communication line" to a fastest communication line among the "one communication lines" as well.

As explained above, the communication system according to this embodiment includes the control unit 15 that monitors states of the communication lines and calculates, every time data that should be transmitted to the receiving apparatus 20 is transmitted to the communication lines, fluctuating transmission rates of the communication lines and the dividing unit 13 that divides the data that should be transmitted to the receiving apparatus 20 into data amounts corresponding to the transmission rates received from the control unit 15 and allocates the data amounts to the communication lines. When transmission of short data allocated to a "one line" is completed and transmission of short data allocated to "the other line" is not completed, the short data of the other lines are transmitted to the "one line" as well. Therefore, even when communication disconnection or an extreme transmission rate delay occurs in the other line that is transmitting short data, it is possible to improve throughput of the entire lines.

Second Embodiment

The communication system according to the first embodiment is configured to transmit data divided according to effective transmission rates to the lines. However, a communication system according to a second embodiment is configured to transmit data divided according to transmission rates calculated taking into account a rate of change.

Components and operations different from those of the communication system according to the first embodiment are explained below with reference to FIGS. 1, 3, and 4 and FIGS. 5 and 6 referred to later. When first time transmission data equivalent to the "initial transmission data" is transmitted to the lines A to C, the control unit 15 calculates "effective transmission rates calculated last time". When the dividing unit 13 receives second time transmission data, the dividing unit 13 divides, based on the "effective transmission rates calculated last time", the second time transmission data. When the divided data are transmitted to the lines A to C, the control unit 15 calculates "effective transmission rates calculated this time". When the dividing unit 13 receives third time transmission data, the dividing unit 13 divides, based on the "effective transmission rates calculated this time", the third time transmission data. The divided data are transmitted to the receiving apparatus 20 via the control unit 15 and the lines in the same manner as explained above.

Figure 5:
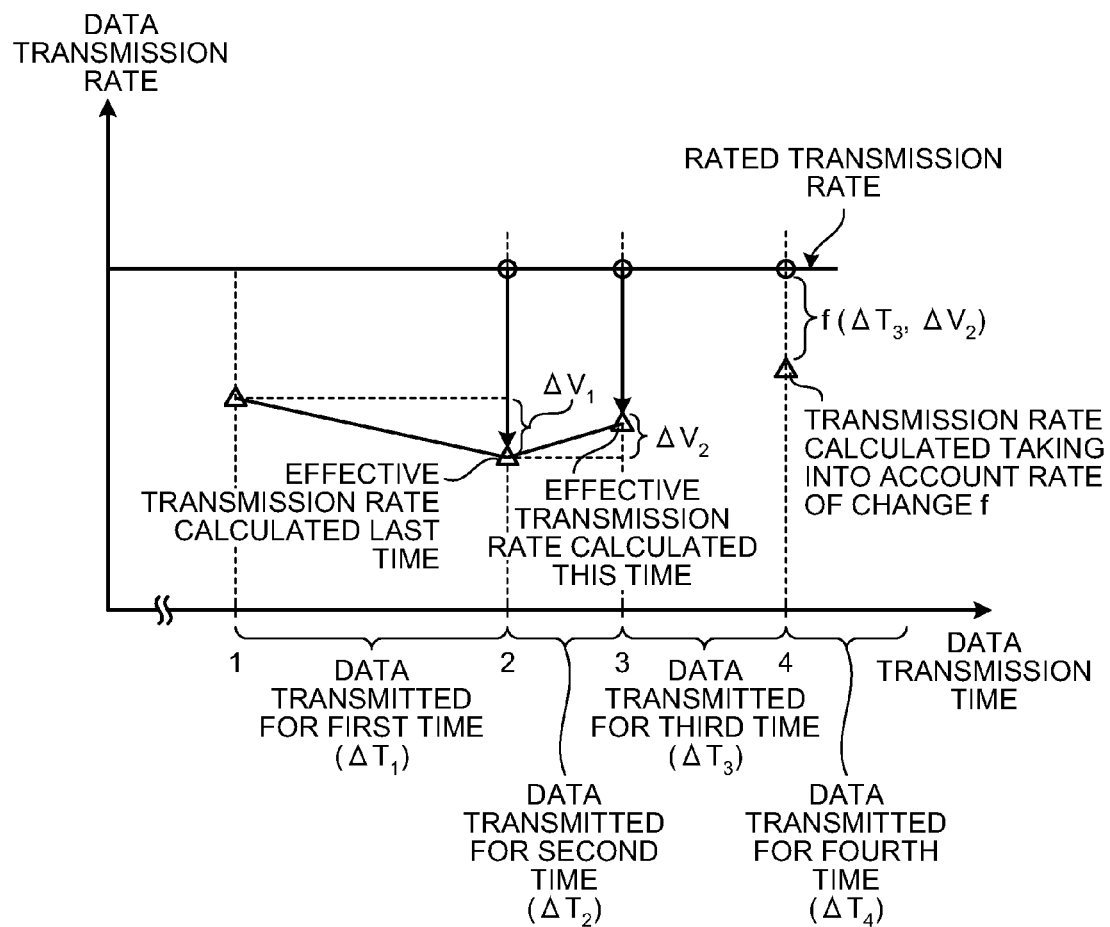
FIG. 5 is a diagram for explaining an operation for calculating a transmission rate taking into account a rate of change.

Operations performed when fourth time transmission data, which is data that should be transmitted this time, is received are explained below. FIG. 5 is a diagram for explaining an operation for calculating a transmission rate taking into account a rate of change. In the control unit 15, $\Delta T1$ as a transmission time until a receiving apparatus completes reception of initial transmission data, $\Delta T2$ as a transmission time until the receiving apparatus completes reception of second time transmission data, and $\Delta T3$ as a transmission time until the receiving apparatus completes reception of third time transmission data are defined. Further, in the control unit 15, a deviation between a transmission rate in transmission of the initial transmission data and an "effective transmission rate calculated last time" is defined as $\Delta V1$ and a deviation between the "effective transmission rate calculated last time" and an "effective transmission rate calculated this time" is defined as $\Delta V2$.

The control unit 15 calculates a rate of change f (the transmission time $\Delta T3$ and the deviation $\Delta V2$), which is information concerning a change in a rated transmission rate, according to the transmission times and the deviations defined as explained above. Further, the control unit 15 calculates a "transmission rate calculated taking into account a rate of change", which is a new transmission rate for dividing "fourth time transmission data" into short data of optimum sizes, according to a calculation "rated transmission rate−rate of change f". When the dividing unit 13 receives the "fourth time transmission data" from the input and output unit 11, the dividing unit 13 divides, based on the "transmission rate calculated taking into account a rate of change", the "fourth time transmission data" into short data and adds serial numbers and the like to the divided data and transmits the divided data to the control unit 15. When the control unit 15 and the dividing unit 13 receive transmission data transmitted for a fifth or more time, the control unit 15 and the dividing unit 13 repeat processing same as the processing explained above. A data transmitting operation by the control unit 15 and a data combining operation by the combining unit 24 are the same as those in the first embodiment. Therefore, explanation of the operations is omitted below.

Figure 6:
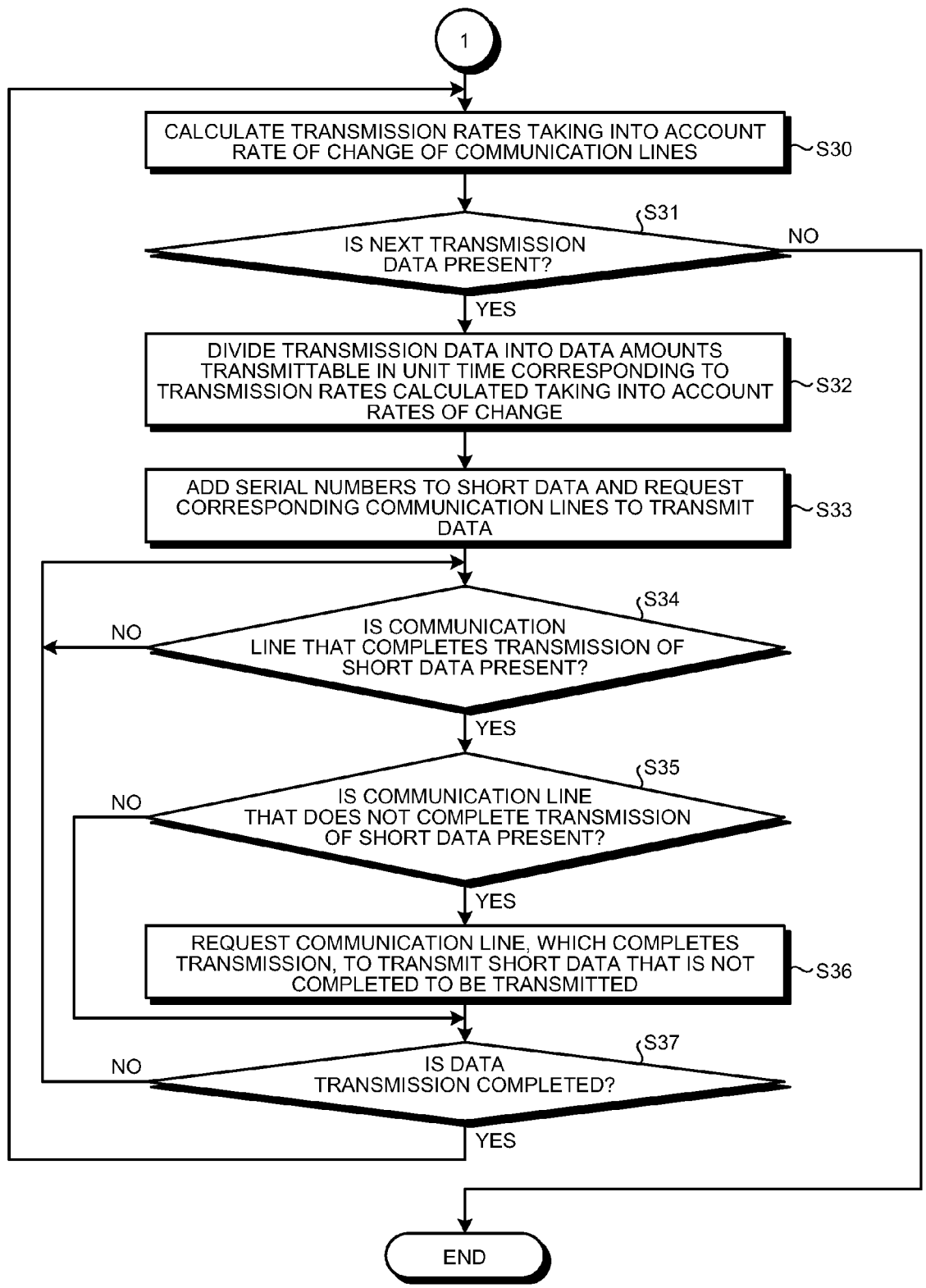
FIG. 6 is a flowchart for explaining a transmission operation for data divided according to transmission rates calculated taking into account a rate of change.

FIG. 6 is a flowchart for explaining a transmission operation for data divided according to transmission rates calculated taking into account a rate of change. The flowchart of FIG. 6 follows the flowchart of FIG. 3. Contents of the flowchart are specifically explained below.

At step S22 in FIG. 4, the dividing unit 13 divides "second time transmission data" and "third time transmission data" into data amounts corresponding to effective transmission rates. At step S27, the control unit 15 transmits divided short data to the lines A to C.

In FIG. 6, the control unit 15 always monitors transmission rates of the lines A to C. When the short data are transmitted, the control unit 15 calculates "transmission rates calculated taking into account a rate of change" (step S30) and outputs the transmission rates to the dividing unit 13. When transmission data transmitted for a fourth or more time, which is the next transmission data, is present (Yes at step S31), the dividing unit 13 divides the transmission data into data amounts corresponding to the transmission rates (step S32). Operations at steps S33 to S37 are the same as the operations at step S23 to S27 in FIG. 4. Therefore, explanation of the operations is omitted.

In the above explanation, as an example, the operation in calculating the rate of change f and transmission rates for the "fourth time transmission data" is explained. However, an operation for transmission data transmitted for the fifth or more time is the same.

In the calculation of the rate of change f, only the transmission time $\Delta T3$ and the deviation $\Delta V2$ are used. However, larger numbers of transmission times $\Delta T$ and deviations $\Delta V$ can be used. In the above explanation, the rate of change f is calculated according to only the transmission time $\Delta T$ and the deviation $\Delta V$. However, if other coefficients or the like are added and values of the rate of change f are more finely set, further throughput improvement can be expected.

As explained above, with the communication system according to this embodiment, the rate of change f is calculated based on the transmission time $\Delta T$ and the deviation $\Delta V$ of data transmitted in the past and transmission rates are calculated according to rated transmission rates and the rate of change f. Therefore, the data dividing unit 13 can divide transmission data according to optimum transmission rates calculated with the rated transmission rates set as references. Even when communication disconnection or an extreme transmission rate delay occurs in a line that is transmitting data, like the communication system according to the first embodiment, it is possible to improve throughput.

The configuration of the communication system explained in this embodiment indicates an example of contents of the present invention. It goes without saying that the configuration can also be combined with another publicly-known technology or can be changed, for example, a part of the configuration can be omitted without departing from the spirit of the present invention.

INDUSTRIAL APPLICABILITY

As explained above, the present invention can be applied to a transmitting apparatus, a transmitting and receiving apparatus, a communication system, and a communication method that can improve communication speed by using a plurality of communication lines. In particular, the present invention is useful as an invention that can realize efficient data communication when communication disconnection or an extreme transmission rate delay occurs in a part of the lines.

REFERENCE SIGNS LIST

10 VEHICLE-SIDE TRANSMITTING AND RECEIVING APPARATUS
11, 21 DATA INPUT AND OUTPUT UNITS
12, 22 DATA PROCESSING UNITS
13, 23 DATA DIVIDING UNITS
14, 24 DATA COMBINING UNITS
15, 25 MULTI-COMMUNICATION CONTROL UNITS
20 GROUND-SIDE TRANSMITTING AND RECEIVING APPARATUS
30, 31, 32, 33, 34, 35 ANTENNAS
A, B, C COMMUNICATION LINES
a1, b1, c1, a2, b2, c2 SHORT DATA

The invention claimed is:

1. A transmitting apparatus that applies a multi-link system employing a logical plurality of communication lines, the transmitting apparatus comprising a transmitting unit that transmits transmission data to a receiving apparatus of a communication partner, wherein the transmitting unit monitors changes in transmission rates of the communication lines, the transmitting unit calculates, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change, and the transmitting unit calculates new transmission rates based on the rate of change and a rated transmission rate, that is a transmission rate of initial setting of the communication lines, and determines, based on the calculated new transmission rates, allocation amounts to the communication lines of data that is to be currently transmitted, wherein, when one communication line that has completed transmission of the transmission data is present and one or a plurality of the other communication lines that have not completed transmission of the transmission data are present, the transmitting unit transmits same data transmitted to a slowest communication line among the other communication lines to the one communication line that has completed transmission of the transmission data.

2. The transmitting apparatus according to claim 1, further comprising:

a dividing unit configured to divide data into short data and add serial numbers and flag bits, and a combining unit configured to perform, based on the serial number, combination and restoration of the short data.

3. A transmitting apparatus that applies a multi-link system employing a logical plurality of communication lines, the transmitting apparatus comprising a transmitting unit that transmits transmission data to a receiving apparatus of a communication partner, wherein the transmitting unit monitors changes in transmission rates of the communication lines, the transmitting unit calculates, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change, and the transmitting unit calculates new transmission rates based on the rate of change and a rated transmission rate, that is a transmission rate of initial setting of the communication lines, and determines, based on the calculated new transmission rates, allocation amounts to the communication lines of data that is to be currently transmitted, wherein, when one or a plurality of communication lines that have completed transmission of the transmission data are present and an other communication line that has not completed transmission of the transmission data are present, the transmitting unit transmits same data transmitted to the other communication line to a fastest communication line among the one communication lines that have completed transmission of the transmission data.

4. The transmitting apparatus according to claim 3, further comprising:

a dividing unit configured to divide data into short data and add serial numbers and flag bits, and a combining unit configured to perform, based on the serial number, combination and restoration of the short data.

5. A communication system that applies a multi-link system employing a logical plurality of communication lines, the communication system comprising:

a transmitting unit that transmits transmission data to a receiving apparatus, which is a communication partner, and a receiving unit that receives data transmitted from a transmitting apparatus, which is a communication partner, wherein the transmitting unit monitors changes in transmission rates of the communication lines, the transmitting unit calculates, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change, and the transmitting unit calculates new transmission rates based on the rate of change and a rated transmission rate, that is a transmission rate of initial setting of the communication lines, and determines, based on the calculated new transmission rates, allocation amounts to the communication lines of data that is to be currently transmitted, wherein, when one communication line that has completed transmission of the transmission data is present and one or a plurality of the other communication lines that have not completed transmission of the transmission data are present, the transmitting unit transmits same data transmitted to a slowest communication line among the other communication lines to the one communication line that has completed transmission of the transmission data.

6. The communication system according to claim 5, wherein a dividing unit included in the transmitting apparatus is configured to divide data into short data and add serial numbers and flag bits, and a combining unit included in the receiving apparatus is configured to perform, based on the serial numbers, combination and restoration of the short data.

7. A communication system that applies a multi-link system employing a logical plurality of communication lines, the communication system comprising:

a transmitting unit that transmits transmission data to a receiving apparatus, which is a communication partner, and a receiving unit that receives data transmitted from a transmitting apparatus, which is a communication partner, wherein the transmitting unit monitors changes in transmission rates of the communication lines, the transmitting unit calculates, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change, and the transmitting unit calculates new transmission rates based on the rate of change and a rated transmission rate, that is a transmission rate of initial setting of the communication lines, and determines, based on the calculated new transmission rates, allocation amounts to the communication lines of data that is to be currently transmitted, wherein, when one or a plurality of communication lines that have completed transmission of the transmission data are present and an other communication line that has not completed transmission of the transmission data is present, the transmitting unit transmits same data transmitted to the other communication line to a fastest communication line among the one or a plurality of communication lines that have completed transmission of the transmission data.

8. The communication system according to claim 7, wherein a dividing unit included in the transmitting apparatus is configured to divide data into short data and add serial numbers and flag bits, and a combining unit included in the receiving apparatus is configured to perform, based on the serial numbers, combination and restoration of the short data.

9. A communication system that applies a multi-link system employing a logical plurality of communication lines, the communication system comprising:

a transmitting apparatus including a transmitting unit that transmits transmission data to a receiving apparatus of a communication partner; and a receiving apparatus including a receiving unit that receives data transmitted from a communication partner, wherein the transmitting unit monitors changes in transmission rates of the communication lines, the transmitting unit calculates, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change, and the transmitting unit calculates new transmission rates based on the rate of change and a rated transmission rate, that is a transmission rate of initial setting of the communication lines, and determines, based on the calculated new transmission rates, allocation amounts to the communication lines of data that is to be currently transmitted, wherein, when one communication line that has completed transmission of the transmission data is present and one or a plurality of the other communication lines that have not completed transmission of the transmission data are present, the transmitting unit transmits same data transmitted to a slowest communication line among the other communication lines to the one communication line that has completed transmission of the transmission data.

10. The communication system according to claim 9, wherein
a dividing unit included in the transmitting apparatus is configured to divide data into short data and add serial numbers and flag bits, and
a combining unit included in the receiving apparatus is configured to perform, based on the serial numbers, combination and restoration of the short data.

11. A communication system that applies a multi-link system employing a logical plurality of communication lines, the communication system comprising:
a transmitting apparatus including a transmitting unit that transmits transmission data to a receiving apparatus of a communication partner; and
a receiving apparatus including a receiving unit that receives data transmitted from a communication partner, wherein
the transmitting unit monitors changes in transmission rates of the communication lines,
the transmitting unit calculates, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change, and
the transmitting unit calculates new transmission rates based on the rate of change and a rated transmission rate, that is a transmission rate of initial setting of the communication lines, and determines, based on the calculated new transmission rates, allocation amounts to the communication lines of data that is to be currently transmitted,
wherein, when one or a plurality of communication lines that have completed transmission of the transmission data are present and an other communication line that has not completed transmission of the transmission data is present, the transmitting unit transmits same data transmitted to the other communication line to a fastest communication line among the one or a plurality of communication lines that have completed transmission of the transmission data.

12. The communication system according to claim 11, wherein
a dividing unit included in the transmitting apparatus is configured to divide data into short data and add serial numbers and flag bits, and
a combining unit included in the receiving apparatus is configured to perform, based on the serial numbers, combination and restoration of the short data.

13. A communication method carried out in a transmitting apparatus that applies a multi-link system employing a logical plurality of communication lines, the transmitting apparatus including a transmitting unit that transmits transmission data to a receiving apparatus of a communication partner, the communication method comprising:
a step of the transmitting unit monitoring changes in transmission rates of the communication lines;
a step of the transmitting unit calculating, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change;
a step of the transmitting unit calculating new transmission rates based on the rate of change and a rated transmission rate, that is a transmission rate of initial setting of the communication lines; and
a step of the transmitting unit determining, based on the calculated new transmission rates, allocation amounts to the communication lines of data that is to be currently transmitted,
wherein, when one communication line that has completed transmission of the transmission data is present and one or a plurality of the other communication lines that have not completed transmission of the transmission data are present, the transmitting unit transmits same data transmitted to a slowest communication line among the other communication lines to the one communication line that has completed transmission of the transmission data.

14. The communication method according to claim 13, wherein
a dividing unit included in the transmitting apparatus divides data into short data and adds serial numbers and flag bits, and
a combining unit included in the receiving apparatus performs, based on the serial numbers, combination and restoration of the short data.

15. A communication method carried out in a transmitting apparatus that applies a multi-link system employing a logical plurality of communication lines, the transmitting apparatus including a transmitting unit that transmits transmission data to a receiving apparatus of a communication partner, the communication method comprising:
a step of the transmitting unit monitoring changes in transmission rates of the communication lines;
a step of the transmitting unit calculating, for each of the communication lines, a rate of change based on a transmission time of first data transmitted in the past and a deviation that is a rate difference between a first effective transmission rate during transmission of the first data and a second effective transmission rate during transmission of second data transmitted immediately before the calculation of the rate of change;
a step of the transmitting unit calculating new transmission rates based on the rate of change and a rated transmission rate, that is a transmission rate of initial setting of the communication lines; and
a step of the transmitting unit determining, based on the calculated new transmission rates, allocation amounts to the communication lines of data that is to be currently transmitted,
wherein, when one or a plurality of one communication lines that have completed transmission of the transmission data are present and an other communication line that has not completed transmission of the transmission data is present, the transmitting unit transmits same data transmitted to the other communication line to a fastest communication line among the one or a plurality of one communication lines that have completed transmission of the transmission data.

16. The communication method according to claim 15, wherein
a dividing unit included in the transmitting apparatus divides data into short data and adds serial numbers and flag bits, and a combining unit included in the receiving apparatus performs, based on the serial numbers, combination and restoration of the short data.

\* \* \* \* \*